United States Patent
Chen

(10) Patent No.: US 10,896,323 B2
(45) Date of Patent: Jan. 19, 2021

(54) METHOD AND DEVICE FOR IMAGE PROCESSING, COMPUTER READABLE STORAGE MEDIUM, AND ELECTRONIC DEVICE

(71) Applicant: GUANGDONG OPPO MOBILE TELECOMMUNICATIONS CORP., LTD., Guangdong (CN)

(72) Inventor: Yan Chen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 104 days.

(21) Appl. No.: 16/296,807

(22) Filed: Mar. 8, 2019

(65) Prior Publication Data

US 2019/0377944 A1  Dec. 12, 2019

(30) Foreign Application Priority Data

Jun. 8, 2018 (CN) .......................... 2018 1 0590043

(51) Int. Cl.
 *G06T 7/00* (2017.01)
 *G06K 9/00* (2006.01)
 (Continued)

(52) U.S. Cl.
 CPC .......... *G06K 9/00536* (2013.01); *G06T 7/11* (2017.01); *G06T 7/136* (2017.01); *G06T 7/194* (2017.01); *G06T 7/50* (2017.01)

(58) Field of Classification Search
 None
 See application file for complete search history.

(56) References Cited

U.S. PATENT DOCUMENTS 6,661,918 B1 * 12/2003 Gordon .................. G06K 9/38
  382/164
9,965,865 B1 * 5/2018 Agrawal ............ G06K 9/00234
(Continued)

FOREIGN PATENT DOCUMENTS

CN    103201769    7/2013
CN    105574857    5/2016
(Continued)

OTHER PUBLICATIONS

Jebari et al. Color and Depth-based superpixels for background and object segmentation, International Symposium on Robotics and Intelligent Sensors 2012 (IRIS 2012) Procedia Engineering 41 (2012) 1307-1315 (Year: 2012).*

(Continued)

*Primary Examiner* — Iman K Kholdebarin
(74) *Attorney, Agent, or Firm* — Hodgson Russ LLP

(57) ABSTRACT

The present disclosure relates to an image processing method and device, a computer readable storage medium, and an electronic device. The method includes: acquiring an image to be processed; detecting a foreground target of the image, and recognizing the foreground target, to obtain a foreground classification result; detecting a background area of the image, and recognizing the background area, to obtain a background classification result; and obtaining a classification label of the image based on the foreground classification result and the background classification result.

18 Claims, 8 Drawing Sheets

(51) Int. Cl.
*G06T 7/136* (2017.01)
*G06T 7/194* (2017.01)
*G06T 7/50* (2017.01)
*G06T 7/11* (2017.01)

(56) References Cited

U.S. PATENT DOCUMENTS

| | | | |
|---|---|---|---|
| 10,217,195 B1* | 2/2019 | Agrawal | G06T 7/11 |
| 10,692,280 B2* | 6/2020 | Shi | G06K 9/6284 |
| 2013/0195359 A1 | 8/2013 | Yabu | |
| 2019/0377944 A1* | 12/2019 | Chen | G06T 7/50 |

FOREIGN PATENT DOCUMENTS

| | | |
|---|---|---|
| CN | 105631868 | 6/2016 |
| CN | 105957053 | 9/2016 |
| CN | 106611417 | 5/2017 |

OTHER PUBLICATIONS

Fuentes, etl al. From Tracking to Advanced Surveillance . IEEE, International Conference on Image Processing Oct. 2003 vol. 3. (Year: 2003).*

WIPO, English Translation of ISR for PCT/CN2019/077207, dated Jun. 5, 2019.

Cimpoi et al., "Deep Filter Banks for Texture Recognition and Segmentation," IEEE Conference on Computer Vision and Pattern Recognition (CVPR), Jun. 2015, pp. 3828-3836.

Fuentes et al., "From Tracking to Advanced Surveillance," IEEE Conference on Image Processing, vol. 3, Sep. 2003, pp. 121-124.

Jebari et al., "Color and Depth-Based Superpixels for Background and Object Segmentation," Procedia Engineering, vol. 41, 2012, pp. 1307-1315.

EPO, Office Action for EP Application No. 19175921.6, dated Oct. 21, 2019.

* cited by examiner

“METHOD AND DEVICE FOR IMAGE PROCESSING, COMPUTER READABLE STORAGE MEDIUM, AND ELECTRONIC DEVICE”

CROSS REFERENCE

This application claims priority to Chinese Patent Application No. 201810590043.8, filed on Jun. 8, 2018, the entire disclosure of which is hereby incorporated by reference.

TECHNICAL FIELD

The present disclosure relates to the technical field of computers, and in particular, to a method and a device for image processing, a computer readable storage medium, and an electronic device.

BACKGROUND

Smart devices can be used to capture images with camera(s) or acquire images transmitted from other smart devices. There are many scene modes for capturing an image can be provided, such as, a beach scene, a snow scene, a night scene and etc. There may also be many target objects that may appear in the captured image, such as, cars, persons, animals, and the like. Generally, images captured in different scene modes may have different color characteristics, and different target objects may have different characteristics in appearance.

SUMMARY

Embodiments of the present disclosure provide a method and a device for image processing, a computer readable storage medium, and an electronic device, which can classify images more accurately.

According to a first aspect of the present disclosure, a method for image processing is provided. The method may include the following steps: acquiring an image to be processed; detecting a foreground target of the image, and recognizing the foreground target, to obtain a foreground classification result; detecting a background area of the image, and recognizing the background area, to obtain a background classification result; and obtaining a classification label of the image based on the foreground classification result and the background classification result.

According to a second aspect of the present disclosure, a device for image processing is provided. The device may include: an image acquisition module configured to acquire an image to be processed; a foreground recognition module configured to detect a foreground target of the image, and recognize the foreground target, to obtain a foreground classification result; a background recognition module configured to detect a background area of the image, and recognize the background area, to obtain a background classification result; and a label generation module configured to obtain a classification label of the image based on the foreground classification result and the background classification result.

According to a third aspect of the present disclosure, a computer readable storage medium having stored thereon a computer program is provided, wherein the computer program is executed by a processor to implement the following steps: acquiring an image to be processed; detecting a foreground target of the image, and recognizing the foreground target, to obtain a foreground classification result; detecting a background area of the image, and recognizing the background area, to obtain a background classification result; and obtaining a classification label of the image based on the foreground classification result and the background classification result.

According to a fourth aspect of the present disclosure, an electronic device including a memory and a processor is provided. The memory stores computer readable instructions, the instructions being executed by the processor, causing the processor to perform the following steps: acquiring an image to be processed; detecting a foreground target of the image, and recognizing the foreground target, to obtain a foreground classification result; detecting a background area of the image, and recognizing the background area, to obtain a background classification result; and obtaining a classification label of the image based on the foreground classification result and the background classification result.

BRIEF DESCRIPTION OF THE DRAWINGS

In order to illustrate the embodiments of the present disclosure or the technical solutions in the prior art more clearly, the drawings to be used in the embodiments or the description of the prior art will be briefly described below. Apparently, the drawings in the following description only show a part of embodiments of the present disclosure, and other possible embodiments can be readily obtained according to these drawings.

DETAILED DESCRIPTION

In order to make the objectives, technical solutions and advantages of the present disclosure more clear, the present disclosure will be further described in details below with reference to the accompanying drawings and embodiments. It should be understood that the specific embodiments described herein are merely illustrative of the application and do not limit the present disclosure in any way.

It will be understood that the terms "first", "second" and the like, as used herein, may be used to describe various elements, but these elements are not limited by these terms.

These terms are only used to distinguish one element from another. For example, a first client may be referred to as a second client, and similarly, a second client may be referred to as a first client, without departing from the scope of the present disclosure. Both the first client and the second client are clients, but they are not the same client.

Figure 1:
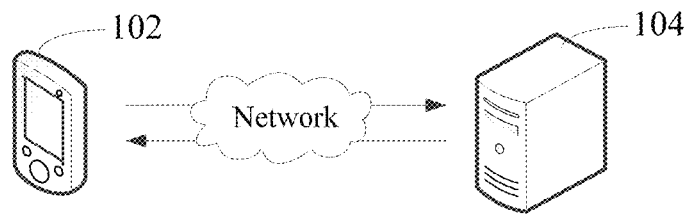
FIG. 1 is a diagram of an application environment for an image processing method according to an embodiment.

FIG. 1 is a diagram of an application environment for an image processing method according to an embodiment. As shown in FIG. 1, the application environment includes a terminal 102 and a server 104. An image to be processed can be transmitted between the terminal 102 and the server 104, and the image can be classified. In one embodiment, the terminal 102 may store a plurality of images to be processed and then send an image to be processed to the server 104. The server 104 stores a classification algorithm for classifying the image, and then can detect the received image to be processed, to obtain a foreground target of the image, and recognize the foreground target to obtain a foreground classification result. The server 104 can detect the background area of the image and recognize the background area to obtain a background classification result. Finally, based on the foreground classification result and the background classification result, the server 104 can obtain a classification label of the image, and send the obtained classification label to the terminal 102. The terminal 102 can classify the image based on the obtained classification label. The terminal 102 is an electronic device at the outermost periphery of the computer network and mainly used for inputting user information and outputting processing results. The terminal 102 may be, for example, a personal computer, a mobile terminal, a personal digital assistant, a wearable electronic device, or the like. The server 104 is a device for providing a computing service in response to a service request, and may be, for example, one or more computers. In other embodiments provided by the present disclosure, the application environment may only include the terminal 102 or the server 104, which is not limited herein.

Figure 2:
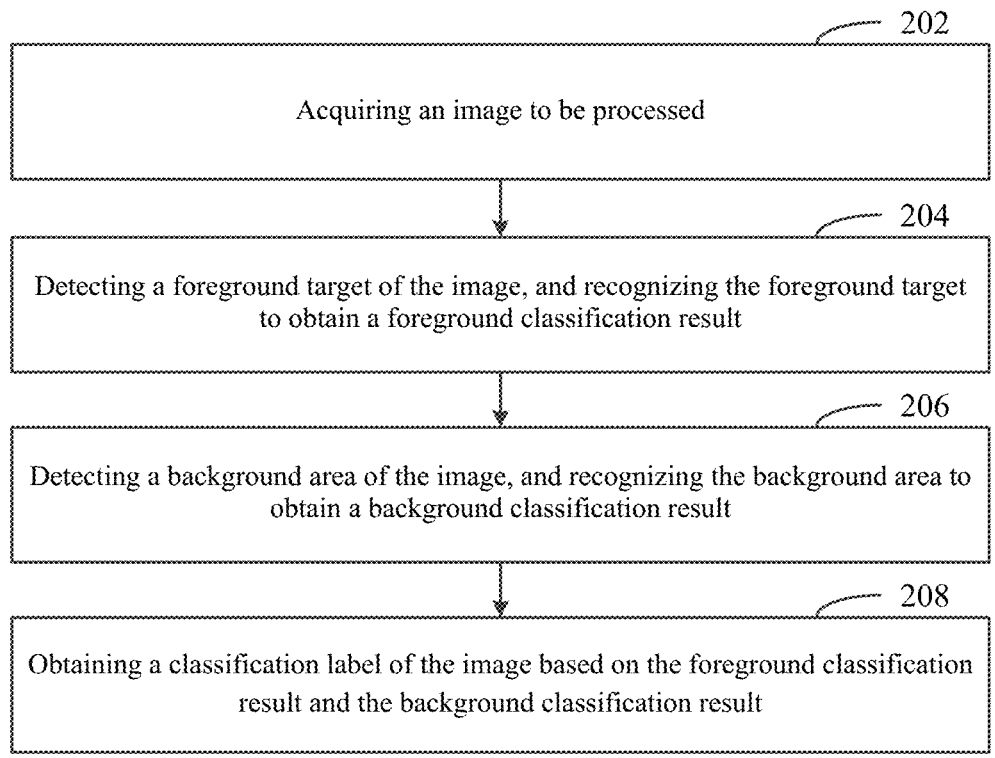
FIG. 2 is a flow chart of an image processing method according to an embodiment.

FIG. 2 is a flow chart of an image processing method according to an embodiment. As shown in FIG. 2, the image processing method includes steps 202 to 208.

In step 202, an image to be processed is acquired.

In an embodiment, the image may be acquired by a camera of the electronic device, or may be acquired from another electronic device, or may be downloaded through a network, which is not limited herein. For example, a camera can be installed in the electronic device, and when the electronic device detects an instruction for capturing an image, the electronic device controls the camera to acquire an image to be processed in response to the instruction for capturing an image. After the electronic device acquires the image, the image may be processed immediately, or the image may be stored in a folder together with other images acquired. After images stored in the folder reaches a certain number, the stored images may be processed together. The electronic device may store the acquired image in an album, and when the number of the images stored in the album exceeds a certain number, processing on the images in the album may be triggered.

In step 204, a foreground target of the image is detected, and the foreground target is recognized to obtain a foreground classification result.

Specifically, a plurality of objects is generally included in a scene in which an image is captured. For example, when an outdoor scene is captured, the image generally includes a pedestrian, a blue sky, a beach, a building, etc. When an indoor scene is captured, the image generally includes objects such as furniture appliances and office supplies. The foreground target refers to a prominent major object in the image, which is the object that the user is interested in, and the background area refers to the rest area of the image except the foreground target.

The image is in a form of a two-dimensional pixel matrix composed of a plurality of pixels, and the electronic device can detect the foreground target of the image. It is detected that some or all of the pixels in the image are included in the foreground target, and then the specific location of the foreground target of the image is marked. Specifically, after detecting the foreground target, the electronic device may mark the foreground target of the image with a rectangular frame, so that the user can directly see the specific location of the detected foreground target from the image.

After detecting the foreground target, the electronic device recognizes the foreground target and then classifies the foreground target. Generally, the electronic device may preset classification types of foreground targets, and then recognize, with a preset classification algorithm, which of the preset classification types the detected foreground target specifically belongs to. For example, the electronic device can classify the foreground target into a type of person, dog, cat, food, or other types, and then recognize which of the forgoing types the detected foreground target specifically belongs to. There may be one or more foreground targets, which is not limited herein. The present disclosure may, but is not limited to, detecting and recognizing a foreground target with algorithms such as Regions with CNN Features (RCNN), Single Shot MultiBox Detector (SSD), You Only Look Once (YOLO) and etc.

In step 206, a background area of the image is detected and recognized, so as to obtain a background classification result.

The electronic device can also detect the background area of the image, and after detecting the background area, recognize which type of scene the background area belongs to. In the electronic device, scene types for background areas may be preset, and then it is recognized, by means of a preset classification algorithm, which of the preset scene types the background area specifically belongs to. For example, the background area may be divided into a type of scene such as beach, snow, night, blue sky, or indoor, and etc. After the background area is recognized, the type of scene corresponding to the background area may be obtained.

It can be understood that the recognition process of the foreground target and the recognition process of the background area on the image by the electronic device may be performed separately or performed in parallel. When the recognition processes are performed separately, the order of the specific recognition processes is not limited, and the foreground target may be first recognized for the image, or the background area be first recognized for the image.

Figure 3:
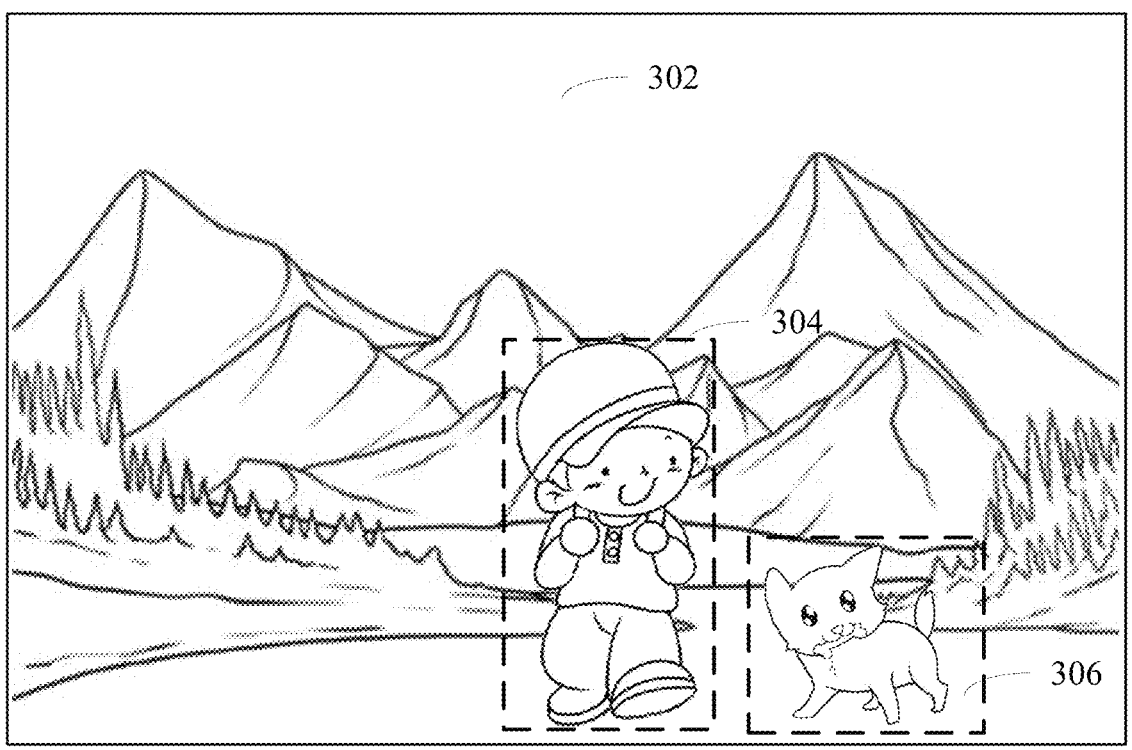
FIG. 3 is a diagram showing a recognition result of an image to be processed according to an embodiment.

FIG. 3 is a diagram showing a recognition result of an image to be processed according to an embodiment. As shown in FIG. 3, after performing foreground and background recognition on the image, a foreground classification result of the foreground target and a background classification result of the background area may be obtained. After recognizing the image in FIG. 3, it may be detected that a background area 302, a foreground target 304 and a foreground target 306 are included in the image. The scene of the detected background area 302 may be classified into a landscape type, the foreground target 304 may be classified into a person, and the foreground target 306 may be classified into a dog. Specifically, the recognized foreground target 304 and foreground target 306 can be marked with a rectangular frame in the image.

In step 208, a classification label of the image is obtained based on the foreground classification result and the background classification result.

In the embodiment provided by the present disclosure, after the image is recognized to obtain the foreground classification result and the background classification result, the image may be labeled. The classification label can be used to label the type of the image, and the electronic device can classify the image based on the classification label, and then process the image based on the classification. The electronic device can also search for the image based on the classification label. For example, the electronic device can store images corresponding to the same classification label in an album, so that the user can classify and search for the corresponding image.

Based on the foreground classification result and the background classification result, a first-level classification label or a multi-level classification label of the image can be obtained. For example, a first-level classification label of the image may be obtained based on the foreground classification result, and a second-level classification label of the image may be obtained based on the background classification result. After the classification label is obtained, the image can be processed based on the classification. When the foreground target is detected as a person, the portrait area can be beautified; and when the background area is detected as a landscape, the saturation and contrast of the background area can be improved. Specifically, the image may be classified into a first level classification based on one of the foreground classification result and the background classification result, and classified into a second level classification based on another of the foreground classification result and the background classification result.

The image processing method provided in the above embodiment can detect and recognize the foreground and the background in the image respectively, and then classify the image based on the recognition result of the foreground and the background, and obtain a classification label of the image. In this way, when the image is classified, both the recognition result of the foreground and the recognition result of the background can be taken into account, and therefore the classification of the image can be more accurate.

Figure 4:
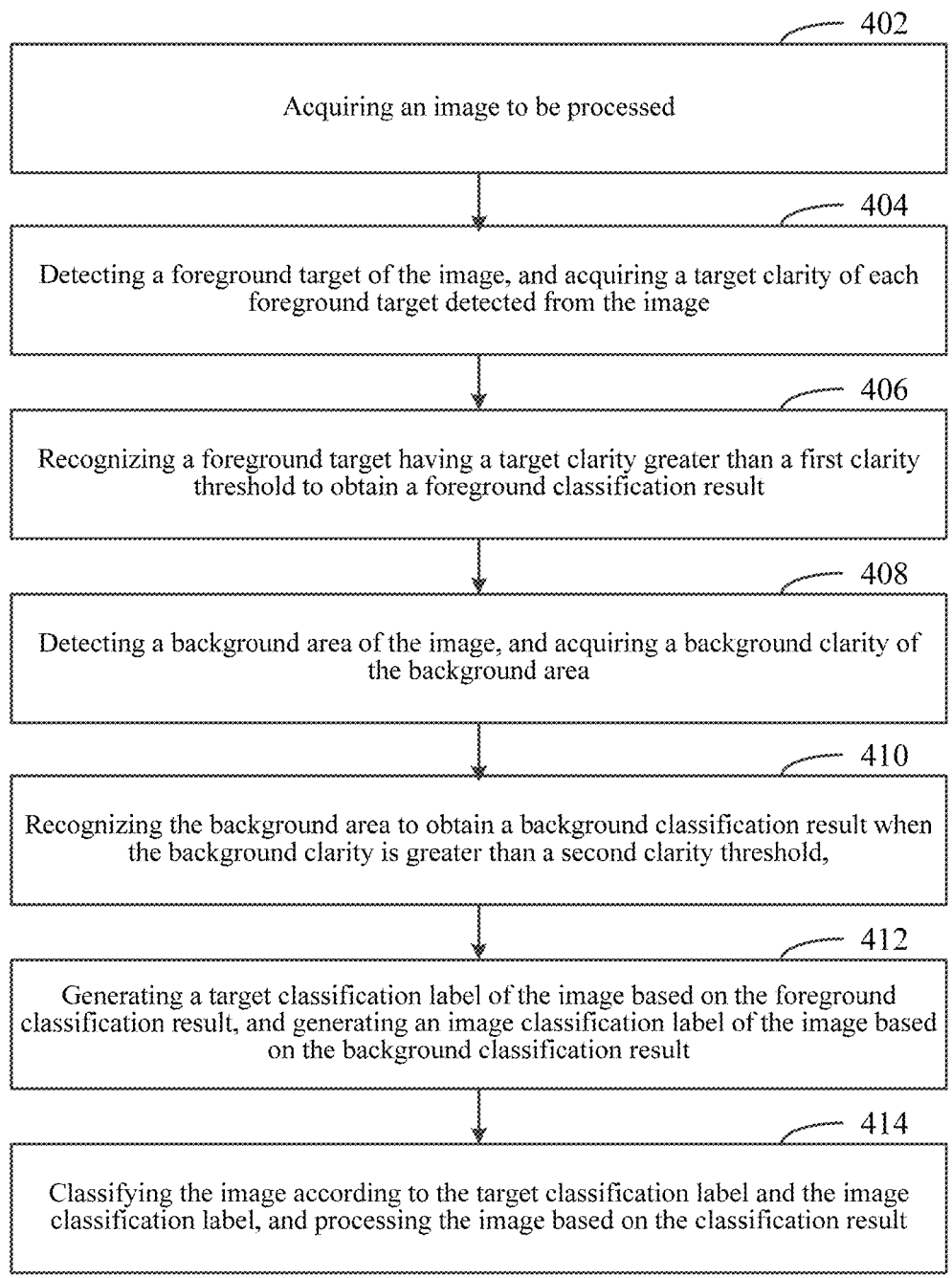
FIG. 4 is a flow chart of an image processing method according to another embodiment.

FIG. 4 is a flow chart of an image processing method according to another embodiment. As shown in FIG. 4, the image processing method includes steps 402 to 414.

In step 402: an image to be processed is acquired.

The image may be acquired in real time, or may be acquired from images stored in advance in the electronic device, and the image may be one or more images. If an image collection containing a plurality of images to be processed is acquired, each image to be processed in the image collection may be traversed, and the foreground and background of the image are recognized.

Generally, the larger the number of images to be processed is, the larger the memory consumed for processing images is and the longer the time period consumed for processing images is. The electronic device may be automatically triggered when the image is processed, or may be manually triggered by a user. An automatic trigger condition may be preset, and when the automatic trigger condition is met, step 402 is performed. For example, when the number of images updated in the electronic device reaches a preset number, the acquisition of the stored image is started, and processing of the image is started. Alternatively, when a specified time is not reached, the image is acquired, and the image is processed.

In step 404, a foreground target of the image is detected, and a target definition of each foreground target detected from the image is acquired.

In an embodiment provided by the present disclosure, when target detection is performed on the image, a plurality of foreground targets may be detected from the image. When two or more foreground targets are detected, each foreground target may be separately recognized to obtain a classification of each foreground target, or one or more of the targets may be selected for identification to obtain a target classification result. For example, when it is detected that two or more foreground targets are contained in the image, one foreground target may be randomly selected for recognition. Alternatively, a foreground target with the largest area is selected for recognition, or a foreground target may be selected for recognition based on the target definition.

After the electronic device detects the foreground target of the image, the target definition corresponding to each foreground target can be calculated. The target definition can reflect the definition degree of texture such as edge details of the foreground target, and can reflect the importance of each foreground target to a certain extent. Therefore, the foreground target for recognition can be selected based on the target definition. For example, when capturing a picture, the user would focus on the object of interest and blur other objects. When recognition process is performed on the foreground target, it is possible to only recognize the foreground target with higher definition, and do not recognize the foreground target with lower definition.

The foreground target contains a plurality of pixels. The definition of the foreground target can be calculated based on a gray difference of the pixels. Generally, the higher the definition is, the larger the gray difference of the pixels is; and the lower the definition is, the smaller the gray difference of the pixels is. In one embodiment, specifically, the target definition may be calculated by means of an algorithm such as a Brenner gradient method, a Tenegrad gradient method, a Laplace gradient method, a variance method, an energy gradient method, or the like, but is not limited thereto.

In step 406, a foreground target having a target definition greater than a first definition threshold is recognized to obtain a foreground classification result.

The image is in a form of a two-dimensional pixel matrix. The electronic device can establish a two-dimensional coordinate system based on the image, and the two-dimensional coordinates can represent the specific positions of the pixel points in the image. For example, a coordinate system may be established with the pixel point at the lower left corner of the image as an origin of the coordinate. With every one pixel point upward, the corresponding coordinate value on the vertical axis is incremented by one; and with every one pixel point rightward, the corresponding coordinate value on the horizontal axis is incremented by one. When detecting the foreground target of the image, the electronic device may mark the area occupied by the foreground target with a rectangular frame, and locate the position of the foreground target with the coordinates corresponding to the four vertices of the rectangular frame.

After detecting the foreground target, the electronic device can assign a foreground identifier to each foreground target to distinguish different foreground targets. Then, a correspondence relationship between the foreground identifiers and the foreground coordinates is established. Each foreground target may be identified with the foreground identifier, and the position of each foreground target of the image may be determined in the foreground coordinates. The electronic device can extract the foreground target based on the foreground coordinates and recognize the extracted foreground target.

When the target definition of the foreground target is greater than the first definition threshold, the definition of the foreground target is considered to be relatively high, and can be regarded as a target object that the user is interested in. When the foreground target has a relatively high target definition, the corresponding accuracy in recognition is also high, and the obtained target classification result is more reliable. Specifically, the first definition threshold may be a preset fixed value or a dynamically varied value, which is not limited herein. For example, it may be a fixed value stored in advance in the electronic device, or may be a value input by the user, dynamically adjusted as desired, or may be a value calculated based on the acquired target clarities.

In step 408, a background area of the image is detected, and a background definition of the background area is acquired.

In an embodiment, the image is divided into a background area and an area where the foreground target is located, and the electronic device may respectively detect the foreground target and the background area of the image. The electronic device may detect the foreground target first, and then take the area in the image other than the foreground target as the background area. Alternatively, the electronic device may detect the background area first, and then take the area in the image other than the background area as the foreground target. Before the background area is recognized, the background definition of the background area may also be acquired.

In step 410, if the background definition is greater than a second definition threshold, the background area is recognized to obtain a background classification result.

The definition of the background area also affects the accuracy of the recognition. The higher the definition is, the more accurate the recognition result is. When the background definition is greater than the second definition threshold, the background area is considered to be relatively clear, and the recognition result of the background area is relatively accurate. When the background definition is less than the second definition threshold, the background area is considered to be relatively fuzzy, and the recognition result of the background area is not accurate. For example, when the user captures an image, the user performs blurring on the background of the image, and the higher the degree of blurring is, the less accurate the recognition result of the image is. Specifically, the second definition threshold may be the same as the first definition threshold, or may be different from the first definition threshold, which is not limited herein.

Specifically, the background area can be recognized by means of a classification model, and the foreground target can be recognized by means of a detection model. Before the electronic device recognizes the background area and the foreground target by means of the classification model and the detection model, the classification model and the detection model are trained, and a corresponding loss function is respectively output. The loss function is a function that can evaluate a confidence level of a classification result. When the background area and the foreground target are recognized, the confidence level corresponding to each preset category can be separately output with the loss function. The higher the confidence level is, the greater the probability that the image belongs to the category is, so the confidence level is used to determine the background type and foreground corresponding to the image.

For example, the background type of the image may be predefined as a type of beach, night scene, firework, indoor, and etc. In the electronic device, the classification model can be trained in advance, and the trained classification model can output a loss function. By inputting the image into the trained classification model, the background area can be detected by means of the classification model and the type of the background area can be recognized. Specifically, the confidence level corresponding to each preset background type may be calculated with the loss function, and the background classification result corresponding to the background area may be determined based on the confidence level. For example, the calculated confidence levels of the four types of a beaches, a night scene, firework, and indoor are 0.01, 0.06, 0.89, and 0.04, respectively, and the background area of the image is determined to be the background classification with the highest confidence level.

Figure 5:
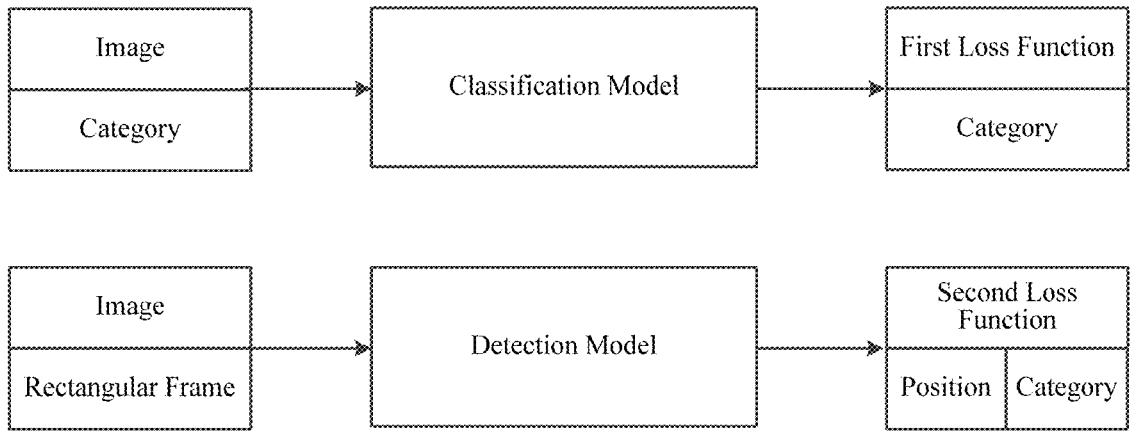
FIG. 5 is a diagram of a model for recognizing foreground and background for an image according to an embodiment.

FIG. 5 is a diagram of a model for recognizing foreground and background for an image according to an embodiment. As shown in FIG. 5, the electronic device can train the classification model. Each image is provided with a category label before the model is trained, and the classification model is trained with the images and the corresponding category labels. After the classification model is trained, a first loss function can be obtained. During the recognition process, a background area in an image may be detected by means of the classification model, and the first confidence level corresponding to each preset background classification is calculated with the obtained first loss function. The background classification result corresponding to the background area can be determined based on the obtained first confidence level. The electronic device can train the detection model. Before the training, the foreground targets included in images are marked with rectangular frames, and the category corresponding to each foreground target is marked. The detection model is trained with the images. After the detection model is trained, a second loss function can be obtained. During the recognition process, a foreground target in an image can be detected by means of the detection model, and the position of each foreground target is outputted. The second confidence level corresponding to each preset foreground classification can be calculated with the second loss function. Based on the obtained second confidence level, the foreground classification result corresponding to the foreground target can be determined. It can be understood that the classification model and the detection model may be two independent algorithm models, and the classification model may be a Mobilenet algorithm model, and the detection model may be an SSD algorithm model, which is not limited herein. The classification model and the detection model can be in series or in parallel.

Figure 6:
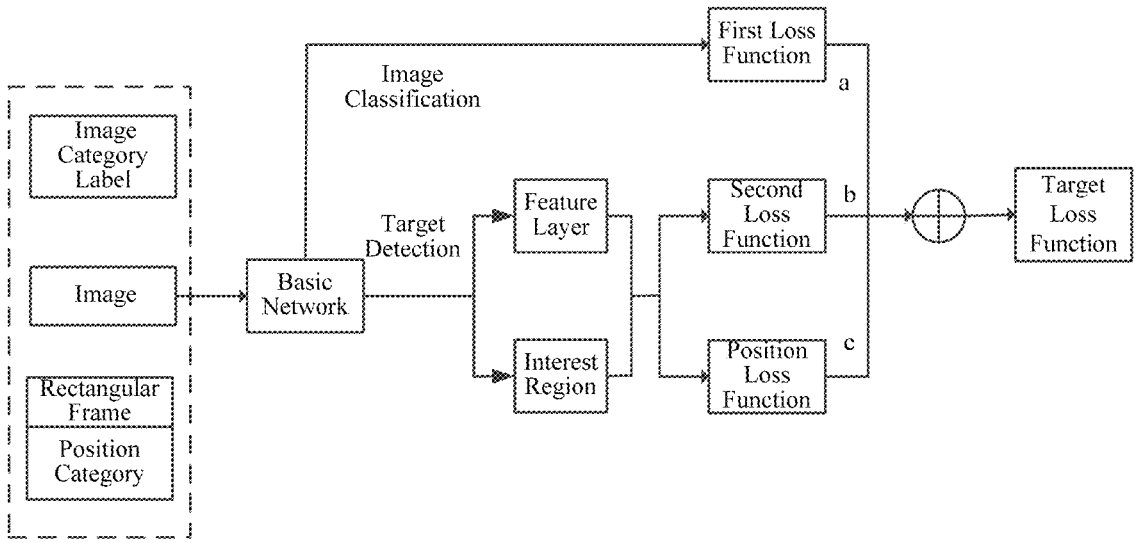
FIG. 6 is a diagram of a model for recognizing foreground and background for an image according to another embodiment.

FIG. 6 is a diagram of a model for recognizing foreground and background for an image according to another embodiment. As shown in FIG. 6, the recognition model is a neural network model. The neural network receives a training image with an image category label at an input layer, performs feature extraction through a basic network (such as a CNN network), and outputs the extracted image features to the feature layer. The feature layer performs the category detection on the background training target to obtain a first loss function, performs category detection on the foreground training target based on the image features to obtain a second loss function, and performs position detection on the foreground training target based on the foreground area to obtain a position loss function. The first loss function, the second loss function, and the position loss function are weighted and then summed, to obtain a target loss function. The neural network can be a convolution neural network. The convolution neural network includes a data input layer, a convolution calculation layer, an activation layer, a pooling layer, and a fully connected layer. The data input layer is configured to pre-process raw image data. The pre-processing can include de-averaging, normalization, dimensionality reduction, and whitening. De-averaging refers to centering each dimension of the input data to zero in order to pull the center of the sample back to the origin of the coordinate system. Normalization refers to normalization of the magnitudes to the same range. Whitening refers to the normalization of the magnitudes on each feature axis of the data. The convolution calculation layer is configured to local association and window sliding. The weight of each filter connection data window in the convolution calculation layer is fixed. Each filter focuses on one image feature, such as a vertical edge, a horizontal edge, colors, a texture, etc., and these filters are combined to obtain a feature extractor collection for the entire image. A filter is a weight matrix. Convolution of data in different windows may be calculated based on the weight matrix. The activation layer is configured to non-linearly map the output of the convolution calculation layer. The activation function used by the activation layer can be a ReLU (Rectified Linear Unit). The pooled layer can be sandwiched between successive convolution calculation layers to compress the amount of data and parameters, and reduce over-fitting. The pooling layer can reduce the dimensionality of the data with a maximum method and an average method. The fully connected layer is located at the end of the convolution neural network, and each neuron between the two layers has a weight for connection. In the convolution neural network, a part of the convolution calculation layers is cascaded to an output node of a first confidence level, a part of the convolution calculation layers is cascaded to an output node of a second confidence level, a part of the convolution calculation layers is cascaded to a position output node. Then, the background classification of the image may be detected based on the output node of the first confidence level, the category of the foreground target of the image may be detected based on the output node of the second confidence level, and a position corresponding to the foreground target may be detected based on the position output node.

Specifically, the classification model and the detection model may be pre-stored in the electronic device, and when the image is acquired, the image is recognized by means of the classification model and the detection model. It can be understood that the classification model and the detection model generally occupy the storage space of the electronic device, and when processing a large number of images, the storage capacity of the electronic device is also required to be relatively high. When the image on the terminal is processed, the image may be processed by means of the classification model and the detection model stored locally in the terminal, or the image may be sent to the server, and processed by means of the classification model and the detection model stored on the server.

Since the storage capacity of the terminal is generally limited, the server can train the classification model and the detection model, and then send the trained classification model and the detection model to the terminal, and the terminal does not need to train the models. Also, the classification model and the detection model stored by the terminal may be compressed, so that the model occupied by the compressed models will be relatively small, but the corresponding accuracy in recognition is relatively low. The terminal can decide whether to perform the recognition processing locally on the terminal or perform the recognition processing on the server based on the number of images to be processed. After acquiring the image, the terminal counts the number of the images to be processed. If the number of images exceeds a preset uploading amount, the terminal uploads the images to be processed to the server, and performs recognition processing of the images to be processed on the server. After the server processes the images, the recognition results are sent to the terminal.

In step 412, a target classification label of the image is generated based on the foreground classification result, and an image classification label of the image is generated based on the background classification result.

The foreground targets in the image are recognized to recognize the type of each foreground target. The foreground target can include one or more, and each foreground target has a corresponding foreground type. The target classification label of the image is generated based on the foreground classification result, and the type of the foreground target included in the image is determined based on the target classification label. Specifically, a target classification label may be separately generated based on each foreground type corresponding to the image. Alternatively, target classification labels may be separately generated based on a part of the foreground types in the image, so that a plurality of target classification labels may be generated.

For example, the image may include three foreground targets, and the corresponding foreground types are "person", "dog", and "cat". The target classification label generated based on the foreground classification result may be a target classification label generated based on all of the foreground types, or may be a target classification label generated based on a part of the foreground types. For example, in case where the target classification label is generated based on all of the foreground types, the generated target classification label can be a three-level label such as "target 1-person", "target 2-dog", and "target 3-cat". In case where the target classification label is generated based on a part of the foreground types, two foreground types "person" and "dog" can be selected from the above three foreground types, and the target classification labels are generated as "target 1-person" and "target 2-dog" respectively.

After the foreground classification result is obtained, the foreground type corresponding to each foreground target included in the image may be determined. When the number of foreground types corresponding to the image is less than a preset number, the electronic device may generate a corresponding target classification label based on each foreground type. When the number of foreground types corresponding to the image exceeds the preset number, the electronic device may count a target number of the foreground targets corresponding to each foreground type, obtain target foreground types from the foreground types based on the target numbers, and generate corresponding target classification labels based on the target foreground types. For example, the foreground types may be sorted based on the target number, and a specified number of foreground types are acquired from the sorted foreground types as the target foreground types.

For example, the image includes a target A, a target B, a target C, a target D, a target E, and a target F, and the corresponding foreground types are "person", "dog", "person", "person", "cat" and "dog". Then, the foreground types corresponding to the image includes "person", "dog" and "cat", and target numbers of the foreground targets of the foreground types "person", "dog" and "cat" are 3, 2 and 1 respectively. In this case, from the foreground types sorted based on the target numbers, the top two foreground types "person" and "dog" are taken as the target foreground types, and then, the target classification labels are generated based on the foreground types "person" and "dog".

Figure 7:
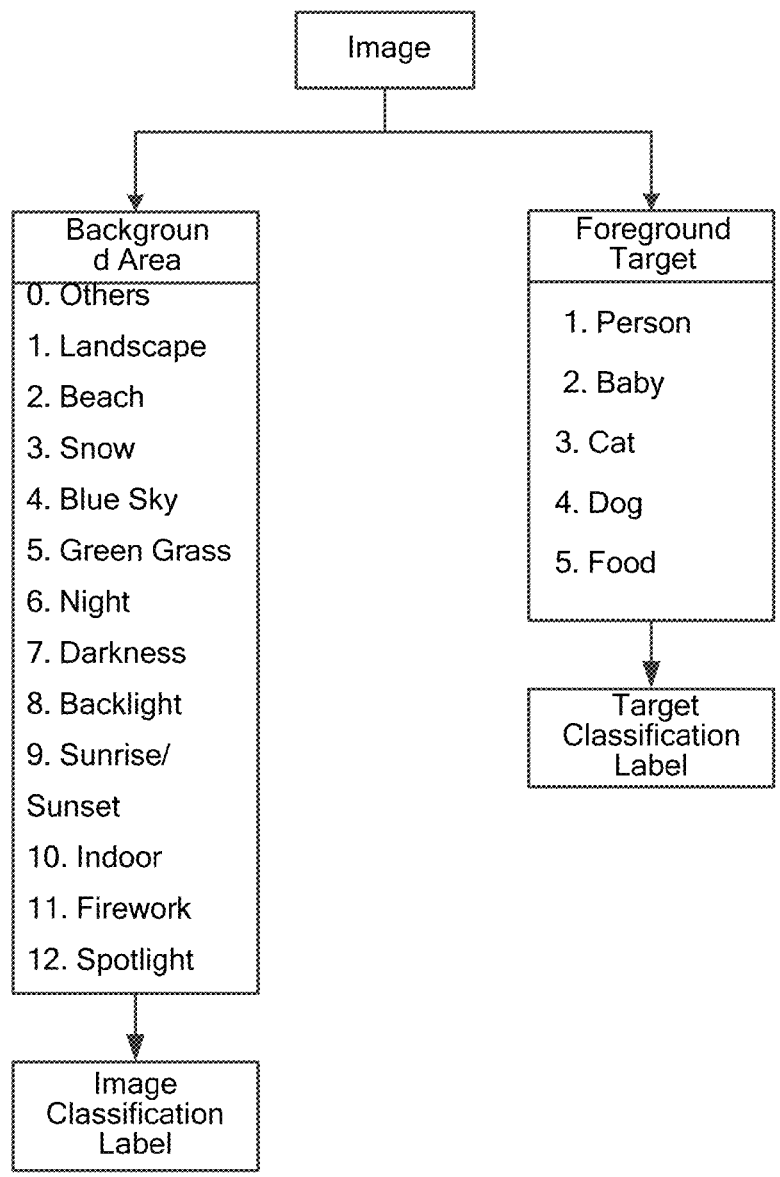
FIG. 7 is a diagram of generating an image classification label according to an embodiment.
Figure 8:
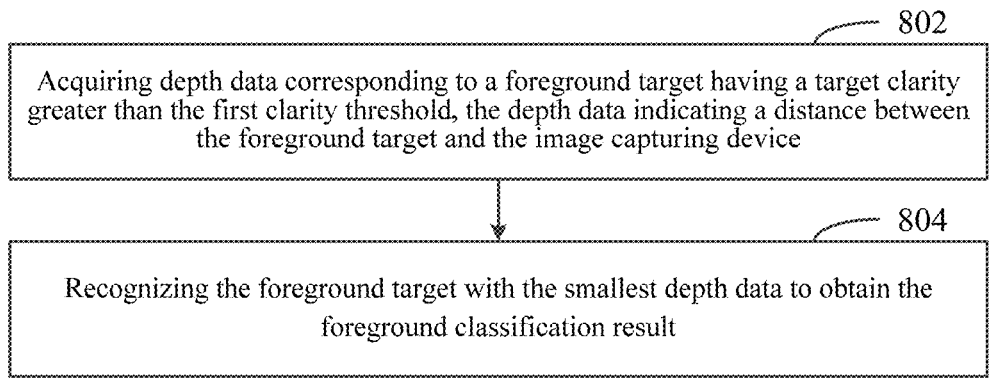
FIG. 8 is a flow chart of an image processing method according to still another embodiment.
Figure 9:
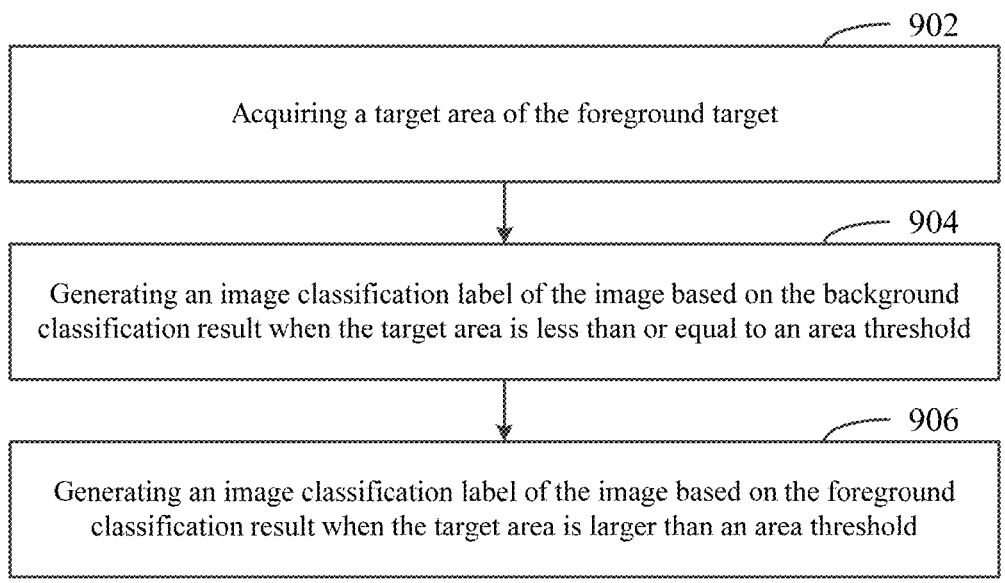
FIG. 9 is a flow chart of an image processing method according to still another embodiment.

In an embodiment provided by the present disclosure, after the background area of the image is recognized, the background classification result is obtained. Generally, in recognition of the background area, only one background type can be obtained, and then the image classification label can be generated based on the background type. The category of the scene for capturing the image can be marked by the image classification label. FIG. 7 is a diagram of generating an image classification label according to an embodiment. As shown in FIG. 7, the image background area is recognized, and image classification label can be obtained, including landscape, beach, snow, blue sky, green space, night, darkness, backlight, sunrise/sunset, indoor, firework, spotlight, and the like. Recognizing the foreground target of the image may obtain a target classification label, including portraits, babies, cats, dogs, food, and so on.

In step 414, the image is classified based on the target classification label and the image classification label, and the image is processed based on the classification result.

After the target classification label and the image classification label are generated, the image can be marked based on the target classification label and the image classification label, so that the user can search for the image based on the generated classification label. For example, the image can be presented based on the classification result, to facilitate the user to view the images to be processed. Also, a search box can be displayed on the display interface. The user can input a search keyword in the search box, and the electronic device can search for the image which contains the search keyword in the classification label, and present the image.

Specifically, the image may be classified, and the image is processed based on the classification result. When classifying the image, the image may be classified into a first level classification based on one of the image classification label and the target classification label, and classified into a second level classification based on the other of the image classification label and the target classification label.

In an embodiment, the method for recognizing the foreground target may further include the following steps.

In step 802, depth data corresponding to a foreground target having a target definition greater than the first definition threshold is acquired, the depth data indicating a distance between the foreground target and the image capturing device.

After detecting the foreground target of the image, the target definition of the foreground target may be acquired, and the foreground target to be recognized is acquired based on the target definition. The foreground target determined based on the target definition may have one or more, and the foreground target for recognition may also be one or more. In one embodiment, if there are two or more foreground targets having a target definition greater than the first definition threshold, one foreground target may be finally determined for recognition. Specifically, the depth data corresponding to the foreground target having a target definition greater than the first definition threshold may be acquired, and the foreground target for recognizing is determined based on the depth data.

The depth data is for indicating the distance between the foreground target and the image capturing device. In the case where the foreground target is relatively clear, the closer the foreground target is to the image capturing device, the more the user is concerned about. The depth data can be obtained by, but not limited to, structured light, dual camera ranging, and the like. Generally, when acquiring the depth data, the electronic device can obtain the depth data corresponding to each pixel point in the image, that is, all the pixel points included in the foreground target have corresponding depth data. The depth data corresponding to the foreground target may be the depth data corresponding to any pixel point in the foreground target, or may be an average value of the depth data corresponding to all the pixel points included in the foreground target, which is not limited herein.

In step 804, the foreground target with the smallest depth data is recognized, to obtain the foreground classification result.

When there are two or more foreground targets having a target definition greater than the first definition threshold, one of the foreground targets may be determined to go through the recognition process. In one embodiment, the foreground target with the smallest depth data may be considered as the foreground target that the user is most concerned about. Then, the foreground target with the smallest depth data is recognized to obtain the foreground classification result.

In other embodiments provided by the present disclosure, the method for generating an image classification label may specifically include the following steps.

In step 902, a target area of the foreground target is acquired.

The detected foreground target is composed of some or all of the pixel points in the image. After detecting the foreground target, the number of pixel points included in the foreground target can be counted. The target area can be represented by the number of pixel points included in the foreground target, or by a ratio of the number of pixel points included in the foreground target against the number of pixels included in the image. In general, the larger the number of pixels included in the foreground target is, the larger the corresponding area is.

In step 904, if the target area is less than or equal to an area threshold, an image classification label of the image is generated based on the background classification result.

In step 906, if the target area is larger than an area threshold, an image classification label of the image is generated based on the foreground classification result.

In one embodiment, if the foreground target occupies a larger area in the image, then the area of the background area is relatively small, so that the recognition of the background area is less accurate. The electronic device can calculate the target area of the foreground target. In case that the target area is less than or equal to the area threshold, it is considered that the larger area in the image is the background, and the image classification label of the image can be generated based on the background classification result. In case that the target area is larger than the area threshold, it is considered that most of the area in the image is a foreground target, and the image classification label can be generated based on the foreground classification result.

Specifically, when the image classification label is generated based on the foreground classification result, if it is determined based on the foreground classification result that the image only includes one foreground type of a target, the image classification label may be directly generated based on the foreground type; and if the image contains only two or more foreground types of foreground targets, a total area of the foreground targets corresponding to each foreground type can be calculated, and the image classification label is generated based on the foreground type with the largest total area. For example, if the image only contains a foreground target of one foreground type "person", the image classification label can be directly generated based on the foreground type "person" as "Pic-person". If the image includes the target A, the target B, and the target C, and the corresponding foreground types are "person", "cat", and "person", respectively. A total area $S_1$ of the target A and the target C in the image corresponding to the target type "person", and a total area $S_2$ in the image of the target "B" corresponding to the "cat" may be respectively calculated. If $S_1 > S_2$, the image classification label will be generated based on the foreground type "person"; if $S_1 < S_2$, the image classification label will be generated based on the foreground type "cat".

The image processing method provided in the above embodiment can detect and recognize the foreground and the background in the image respectively, and then classify the image based on the recognition result of the foreground and the background, and obtain a classification label of the image. In this way, when the image is classified, the recognition result of the foreground and the recognition result of the background can be taken into account, therefore the classification of the image can be more accurate.

It should be understood that although the steps in the flow charts of FIGS. 2, 4, 8, and 9 are sequentially displayed in accordance with the indication of the arrows, these steps are not necessarily performed in the order indicated by the arrows. Except as explicitly stated herein, the execution of these steps is not strictly limited, and the steps may be performed in other orders. Moreover, at least some of the steps in FIG. 2, FIG. 4, FIG. 8, and FIG. 9 may include a plurality of sub-steps or stages, which are not necessarily performed at the same time, but may be at different times. The order of execution of these sub-steps or stages is not necessarily performed sequentially, but may be performed in turn or alternately with at least a portion of other steps or sub-steps or stages of other steps.

Figure 10:
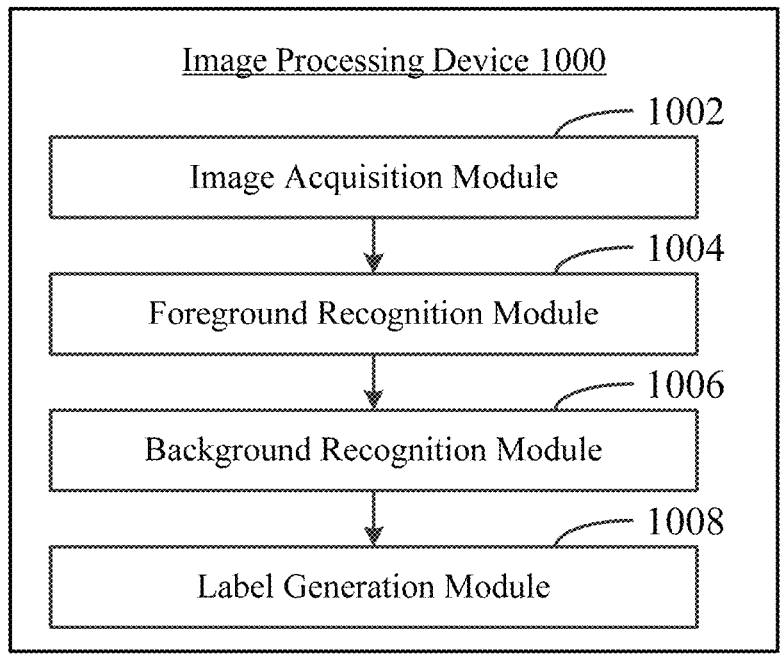
FIG. 10 is a block diagram of an image processing device according to an embodiment.

FIG. 10 is a block diagram of an image processing device according to an embodiment. As shown in FIG. 10, the image processing device 1000 includes an image acquisition module 1002, a foreground recognition module 1004, a background recognition module 1006 and a label generation module 1008.

The image acquisition module 1002 is configured to acquire an image to be processed.

The foreground recognition module 1004 is configured to detect a foreground target of the image, and recognize the foreground target to obtain a foreground classification result.

The background recognition module 1006 is configured to detect a background area of the image, recognize the background area to obtain a background classification result.

The label generation module 1008 is configured to obtain a classification label of the image based on the foreground classification result and the background classification result.

The image processing device provided in the above embodiment can detect and recognize the foreground and the background in the image respectively, and then classify the image based on the recognition result of the foreground and the background, and obtain a classification label of the image. In this way, when the image is classified, the recognition result of the foreground and the recognition result of the background can be taken into account, therefore the classification of the image can be more accurate.

Figure 11:
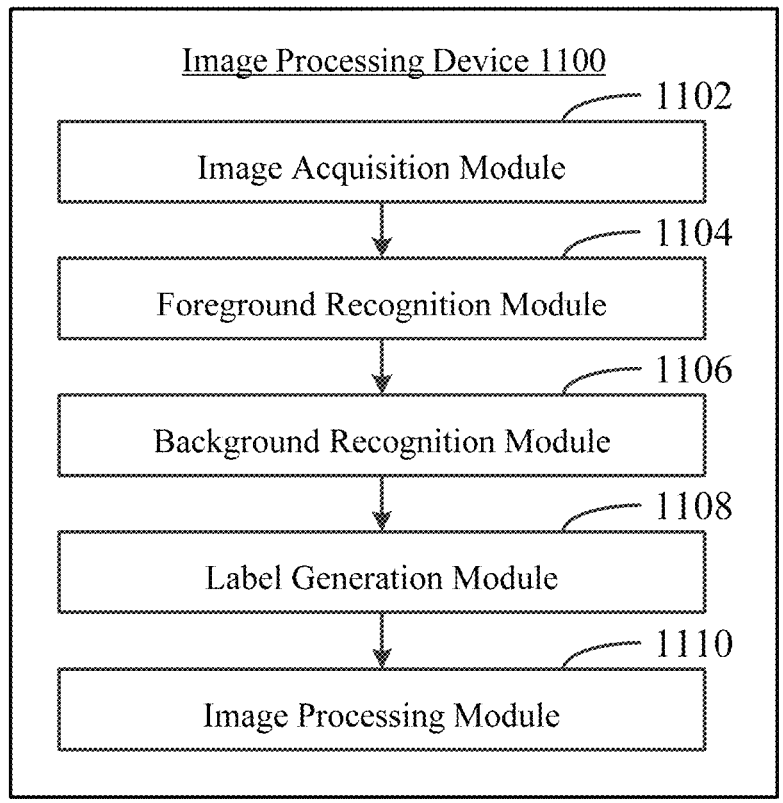
FIG. 11 is a block diagram of an image processing device according to another embodiment.

FIG. 11 is a block diagram of an image processing device according to another embodiment. As shown in FIG. 11, the image processing device 1100 includes an image acquisition module 1102, a foreground recognition module 1104, a background recognition module 1106, a label generation module 1108 and an image processing module 1110.

The image acquisition module 1102 is configured to acquire an image to be processed.

The foreground recognition module 1104 is configured to detect a foreground target of the image, and recognize the foreground target to obtain a foreground classification result.

The background recognition module 1106 is configured to detect a background area of the image, recognize the background area to obtain a background classification result.

The label generation module 1108 is configured to obtain a classification label of the image based on the foreground classification result and the background classification result.

The image processing module 1110 is configured to classify the image based on the target classification label and the image classification label, and process the image based on the classification result.

The image processing device provided in the above embodiment can detect and recognize the foreground and the background in the image respectively, and then classify the image based on the recognition result of the foreground and the background, and obtain a classification label of the image. In this way, when the image is classified, the recognition result of the foreground and the recognition result of the background can be taken into account, therefore the classification of the image can be more accurate.

In an embodiment, the foreground recognition module 1104 is further configured to acquire a target definition of each foreground target detected from the image; and recognize a foreground target having a target definition greater than a first definition threshold to obtain a foreground classification result.

In an embodiment, the foreground recognition module 1104 is further configured to acquire depth data corresponding to a foreground target having a target definition greater than the first definition threshold, the depth data indicating a distance between the foreground target and the image capturing device; and recognize the foreground target with the smallest depth data, to obtain the foreground classification result.

In an embodiment, the background recognition module 1106 is further configured to acquire a background definition of the background area; and if the background definition is greater than a second definition threshold, recognize the background area to obtain a background classification result.

In an embodiment, the label generation module 1108 is further configured to generate a target classification label of the image based on the foreground classification result, and generate an image classification label of the image based on the background classification result.

In an embodiment, the label generation module 1108 is further configured to acquire a target area of the foreground target; if the target area is less than or equal to an area threshold, generate an image classification label of the image based on the background classification result; and if the target area is larger than an area threshold, generate an image classification label of the image based on the foreground classification result.

The division of each module in the image processing device is for illustrative purposes only. In other embodiments, the image processing device may be divided into different modules as desired to complete all or part of the functions of the image processing device.

The embodiment of the present disclosure also provides a computer readable storage medium. One or more non-transitory computer readable storage media containing computer executable instructions that, when executed by one or more processors, cause the processor to perform image processing provided by the above embodiments method.

A computer program product includes instructions which, when run on a computer, cause the computer to perform the image processing method provided by the above embodiments.

Figure 12:
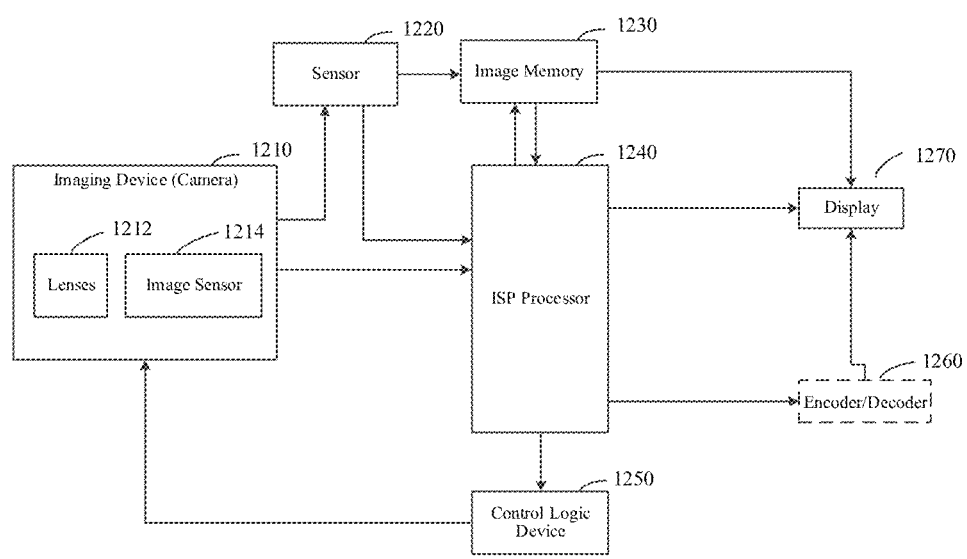
FIG. 12 is a block diagram of a circuit for image processing according to an embodiment.

An embodiment of the present disclosure further provides an electronic device. The electronic device includes a circuit for image processing, and the circuit can be implemented in hardware and/or software components, and can include various processing units defining an ISP (Image Signal Processing) pipeline. FIG. 12 is a block diagram of a circuit for image processing according to an embodiment. As shown in FIG. 12, for convenience of explanation, only various aspects of the image processing technique related to the embodiment of the present disclosure are shown.

As shown in FIG. 12, the circuit for image processing includes an ISP processor 1240 and a control logic device 1250. Image data captured by an image capturing device 1210 is first processed by the ISP processor 1240. The ISP processor 1240 analyzes the image data to capture image statistical information that can be used to determine one or more control parameters of the image capturing device 1210. The image capturing device 1210 can include a camera having one or more lenses 1212 and an image sensor 1214. The image sensor 1214 may include a color filter array (such as a Bayer filter) that may acquire light intensity and wavelength information captured with each imaging pixel of the image sensor 1214 and provide a set of raw image data that may be processed by the ISP processor 1240. A sensor 1220, such as a gyroscope, can provide acquired image processing parameters, such as anti-shake parameters, to the ISP processor 1240 based on the interface type of the sensor 1220. The interface of the sensor 1220 may utilize a SMIA (Standard Mobile Imaging Architecture) interface, other serial or parallel camera interfaces, or a combination of the above.

In addition, the image sensor 1214 can also transmit raw image data to the sensor 1220. The sensor 1220 can provide the raw image data to the ISP processor 1240 based on the interface type of the sensor 1220, or the sensor 1220 can store the raw image data into an image memory 1230.

The ISP processor 1240 processes the raw image data pixel by pixel in a variety of formats. For example, each image pixel may have a bit depth of 8, 10, 12, or 14 bits, and the ISP processor 1240 may perform one or more image processing operations on the raw image data, collecting statistical information about the image data. The image processing operations can be performed with the same or different bit depth precision.

The ISP processor 1240 can also receive image data from image memory 1230.

For example, the interface of the sensor 1220 transmits raw image data to the image memory 1230, and the raw image data in the image memory 1230 is then provided to the ISP processor 1240 for processing. The image memory 1230 can be part of a memory device, a storage device, or a separate dedicated memory within the electronic device, and can include Direct Memory Access (DMA) features.

The ISP processor 1240 may perform one or more image processing operations, such as time domain filtering, upon receiving raw image data from the interface of the image sensor 1214 or from the interface of the sensor 1220 or from the image memory 1230. The processed image data can be sent to image memory 1230 for additional processing prior to being displayed. The ISP processor 1240 receives the processed data from the image memory 1230 and performs image data processing in the original domain and in the RGB and YCbCr color spaces. The image data processed by the ISP processor 1240 can be output to a display 1270 for viewing by the user and/or further processed by a graphics engine or a Graphics Processing Unit (GPU). Additionally, the output of the ISP processor 1240 can also be sent to the image memory 1230, and the display 1270 can read image data from the image memory 1230. In one embodiment, the image memory 1230 can be configured to implement one or more frame buffers. In addition, the output of the ISP processor 1240 can be sent to an encoder/decoder 1260 to encode/decode image data. The encoded image data can be stored and decompressed before being displayed on the display 1270. The encoder/decoder 1260 can be implemented by a CPU or a GPU or a coprocessor.

The statistical data determined by the ISP processor 1240 can be sent to the control logic device 1250. For example, the statistics may include statistic information of the image sensor 1214, such as auto exposure, auto white balance, auto focus, flicker detection, black level compensation, shading correction of lens 1212, and the like. The control logic device 1250 can include a processor and/or a microcontroller that executes one or more routines, such as firmware, and the one or more routines can determine control parameters of the image capturing device 1210 and the ISP processor 1240 based on the received statistical data. For example, control parameters of the image capturing device 1210 may include control parameters of the sensor 1220 (e.g., a gain, an integration time for exposure control, an anti-shake parameter, etc.), control parameters for camera flash, control parameters of the lens 1212 (e.g., a focal length for focus or zoom), or a combination of these parameters. The ISP control parameters may include a gain levels and a color correction matrices for automatic white balance and color adjustment (e.g., during RGB processing), as well as shading correction parameters of the lens 1212.

The image processing method provided by the above embodiments is implemented by utilizing the image processing technology in FIG. 12 as follows.

Any reference to a memory, storage, a database, or other medium used herein may include a non-volatile and/or volatile memory. Suitable non-volatile memories can include a ROM (read only memory), a PROM (programmable ROM), an EPROM (electrically programmable ROM), an electrically erasable programmable ROM (EEPROM), or a flash memory. Volatile memory can include random access memory (RAM), which acts as an external cache. By way of illustration, and not for limitation, the RAM is available in a variety of forms, such as a static RAM (SRAM), a dynamic RAM (DRAM), a synchronous DRAM (SDRAM), a double data rate SDRAM (DDR SDRAM), an enhanced SDRAM (ESDRAM), a synchronization Link (Synchlink) DRAM (SLDRAM), a Memory Bus (Rambus) Direct RAM (RDRAM), a Direct Memory Bus Dynamic RAM (DRDRAM), and a Memory Bus Dynamic RAM (RDRAM).

The above-mentioned embodiments are merely illustrative of several embodiments of the present disclosure, and the description thereof is more specific and detailed, but is not to be construed as limiting the scope of the present disclosure. It should be noted that a number of variations and modifications may be made by those skilled in the art without departing from the spirit and scope of the present disclosure. Therefore, the scope of the present disclosure should be determined by the appended claims.

What is claimed is:

1. An image processing method, comprising:
acquiring an image to be processed;
detecting at least one foreground target of the image, and recognizing the at least one foreground target to obtain a foreground classification result;
detecting a background area of the image, and recognizing the background area to obtain a background classification result; and
obtaining a classification label of the image based on the foreground classification result and the background classification result;
wherein recognizing the at least one foreground target to obtain a foreground classification result comprises:
acquiring a target definition of each foreground target detected from the image; and
recognizing the at least one foreground target having the target definition greater than a first definition threshold to obtain the foreground classification result;
wherein the target definition refers to a gray difference of a plurality of pixels contained in the foreground target.

2. The method of claim 1, wherein recognizing the at least one foreground target having the target definition greater than the first definition threshold to obtain the foreground classification result comprises:
acquiring depth data of at least one foreground target having the target definition greater than the first definition threshold, the depth data indicating a distance between the foreground target and an image capturing device; and
recognizing the foreground target with smallest depth data, to obtain the foreground classification result.

3. The method of claim 1, wherein recognizing the background area to obtain a background classification result comprises:
acquiring a background definition of the background area; and
recognizing the background area to obtain a background classification result when the background definition is greater than a second definition threshold.

4. The method of claim 1, wherein obtaining a classification label of the image based on the foreground classification result and the background classification result comprises:
generating a target classification label of the image based on the foreground classification result, and generating an image classification label of the image based on the background classification result.

5. The method of claim 4, wherein generating the image classification label of the image based on the background classification result comprises:
acquiring a target area of the foreground target;
generating an image classification label of the image based on the background classification result when the target area is less than or equal to an area threshold; and
generating an image classification label of the image based on the foreground classification result when the target area is larger than the area threshold.

6. The method of claim 1, wherein after obtaining a classification label of the image based on the foreground classification result and the background classification result, the method further comprises:
classifying the image based on the target classification label and the image classification label, and processing the image based on the classification result.

7. An image processing device, comprising:
one or more computing devices configured to execute one or more software modules, the one or more software modules including:
an image acquisition module configured to acquire an image to be processed;
a foreground recognition module configured to detect at least one foreground target of the image, and recognize the at least one foreground target to obtain a foreground classification result;
a background recognition module configured to detect a background area of the image, and recognize the background area to obtain a background classification result; and
a label generation module configured to obtain a classification label of the image based on the foreground classification result and the background classification result;
wherein the foreground recognition module is further configured to:
acquire a target definition of each foreground target detected from the image; and
recognize the at least one foreground target having the target definition greater than a first definition threshold to obtain the foreground classification result;
wherein the target definition refers to a gray difference of a plurality of pixels contained in the foreground target.

8. A computer readable storage medium having stored thereon a computer program, wherein the computer program is executed by a processor to implement the method of claim 1.

9. An electronic device comprising:
a memory; and
a processor,
wherein the memory stores computer readable instructions, when the instructions are executed by the processor, the processor is configured to:
acquire an image to be processed;
detect at least one foreground target of the image, and recognize the at least one foreground target to obtain a foreground classification result;
detect a background area of the image, and recognize the background area to obtain a background classification result; and
obtain a classification label of the image based on the foreground classification result and the background classification result;
wherein the processor is further configured to:
acquire a target definition of each foreground target detected from the image; and
recognize the at least one foreground target having the target definition greater than a first definition threshold to obtain the foreground classification result;
wherein the target definition refers to a gray difference of a plurality of pixels contained in the foreground target.

10. The electronic device of claim 9, wherein the processor is further configured to:
acquire depth data corresponding to the one or more foreground targets having the target definition greater than the first definition threshold, the depth data indicating a distance between the foreground target and an image capturing device; and
recognize the foreground target with smallest depth data to obtain the foreground classification result.

11. The electronic device of claim 9, wherein the processor is further configured to:
   acquire a background definition of the background area; and
   recognize the background area to obtain a background classification result when the background definition is greater than a second definition threshold.

12. The electronic device of claim 9, wherein the processor is further configured to:
   generate a target classification label of the image based on the foreground classification result, and generating an image classification label of the image based on the background classification result.

13. The electronic device of claim 12, wherein the processor is further configured to:
   acquire a target area of the foreground target;
   generate an image classification label of the image based on the background classification result when the target area is less than or equal to an area threshold; and
   generate an image classification label of the image based on the foreground classification result when the target area is larger than the area threshold.

14. The electronic device of claim 9, wherein the processor is further configured to:
   classify the image based on the target classification label and the image classification label, and process the image based on the classification result.

15. The electronic device of claim 9, wherein the processor is further configured to:
   classify the image based on the target classification label and the image classification label, and process the image based on the classification result.

16. The electronic device of claim 10, wherein the processor is further configured to:
   classify the image based on the target classification label and the image classification label, and process the image based on the classification result.

17. The electronic device of claim 11, wherein the processor is further configured to:
   classify the image based on the target classification label and the image classification label, and process the image based on the classification result.

18. The electronic device of claim 12, wherein the processor is further configured to:
   classify the image based on the target classification label and the image classification label, and process the image based on the classification result.

* * * * *